United States Patent
Angelskaar

(10) Patent No.: US 7,037,369 B2
(45) Date of Patent: May 2, 2006

(54) ACCELERATOR COMPOSITION

(75) Inventor: Terje Angelskaar, Zurich (CH)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/491,012

(22) PCT Filed: Aug. 26, 2002

(86) PCT No.: PCT/EP02/09528

§ 371 (c)(1),
(2), (4) Date: Aug. 17, 2004

(87) PCT Pub. No.: WO03/029163

PCT Pub. Date: Apr. 10, 2003

(65) Prior Publication Data

US 2004/0255825 A1    Dec. 23, 2004

(30) Foreign Application Priority Data

Sep. 28, 2001   (GB)  ................................. 0123364.2

(51) Int. Cl.
*C04B 40/00*   (2006.01)
*C04B 28/02*   (2006.01)

(52) U.S. Cl. ...................... 106/823; 106/717; 106/727; 106/728; 106/808; 106/810; 106/815

(58) Field of Classification Search ................ 106/638, 106/810, 815, 717, 727, 728, 808, 823
See application file for complete search history.

(56) References Cited

U.S. PATENT DOCUMENTS

| | | | | |
|---|---|---|---|---|
| 5,935,318 A | * | 8/1999 | Angelskar et al. | 106/727 |
| 6,302,954 B1 | * | 10/2001 | Lunkenheimer et al. | 106/727 |
| 6,692,564 B1 | * | 2/2004 | Hofmann | 106/696 |
| 6,723,163 B1 | * | 4/2004 | Hofmann | 106/727 |

FOREIGN PATENT DOCUMENTS

| | | |
|---|---|---|
| WO | WO 98/18740 | 5/1998 |
| WO | WO 00/78688 A1 | 12/2000 |
| WO | WO 01/42165 | 6/2001 |

* cited by examiner

Primary Examiner—Anthony J. Green
(74) Attorney, Agent, or Firm—Curatolo Sidoti Co. LPA

(57) ABSTRACT

An alkali-free accelerator for use with spray-applied cementitious compositions such as concrete and mortar is the reaction product in aqueous medium of amorphous aluminium hydroxide, aluminium sulphate, formic acid and phosphoric acid. These accelerators perform as well as known alkali-free accelerators and are exceptionally stable, even in hot conditions.

26 Claims, No Drawings

ACCELERATOR COMPOSITION

CROSS REFERENCE TO RELATED APPLICATIONS

This application is a national stage application of International Application No. PCT/EP02/09528, filed Aug. 26, 2002, which claims the benefit of Application No. GB 0123364.2, filed Sep. 28, 2001, from which applications priority is claimed.

This invention relates to cementitious compositions and to accelerating admixtures for use therein, especially as accelerators for sprayed concrete.

Sprayed concrete or "shotcrete", which is applied to substrates such as rock faces and tunnels by spraying, must set very rapidly. In such a use, the traditional concrete accelerators such as calcium chloride are not effective, and there must be used more powerful accelerators, such as sodium aluminate and alkali metal hydroxides. These are highly alkaline, which gives rise both to handling difficulties and unpleasant conditions when spraying in confined spaces such as tunnels.

As a result, a new generation of alkali-free accelerators has been developed. These are based on aluminium compounds, usually the hydroxide, sulphate or basic sulphate. To these essential components have been added other components, such as alkanolamines and alkanolamine sulphates.

These aluminium-based accelerators have been very successful. However, most of them suffer from the major drawback of inadequate stability. Many such accelerators are aqueous solutions or dispersions with high solids contents (in the case of solutions, close to saturation), and if kept stored for a prolonged period, especially in high ambient temperatures, dissolved material may come out of the solution, or dispersed material may settle, or the aqueous accelerator may gel. All these things can reduce the effectiveness of the accelerator considerably or even completely.

One of the ways in which it has been sought to overcome this stability problem is to add a stabilising material. For example, in PCT published application WO 01/42165, there is disclosed the use of stabilising materials selected from hydroxycarboxylic acids, phosphoric acids and non-alkaline salts of phosphoric acids, added at the rate of up to 0.06 mol/kg. of final product at the end of the manufacturing process.

It has now been found that the reaction of aluminium compounds with a plurality of acids can give an accelerator of excellent performance and stability. The invention therefore provides an accelerator for sprayed cementitious compositions, which is the reaction product in aqueous medium of amorphous aluminium hydroxide, aluminium sulphate, formic acid and phosphoric acid.

The invention additionally provides a method of preparation of an accelerator for sprayed cementitious compositions by the reaction of amorphous aluminium hydroxide, aluminium sulphate, formic acid and phosphoric acid in an aqueous medium.

The aluminium sulphate used may be any such commercially-available material. Aluminium sulphates differ in their purity and constitution, the most common being so-called "17%" because it contains 17% of $Al_2O_3$. In practical terms, the weight percentage of 17% aluminium sulphate, $Al_2(SO_4)_3 \cdot 14.3 H_2O$ that should be used in the process according to the invention lies in the range of from 30% to 60%, preferably from 40%–48%.

The aluminium hydroxide may be any commercially-available amorphous aluminium hydroxide. Although all such aluminium hydroxides will give satisfactory results, it is generally true that the more recent the date of manufacture, the better the result. In addition, aluminium hydroxides which, as a result of their particular manner of manufacture, contain a small proportion of aluminium carbonate (up to 5%) are easier to dissolve and are preferred materials. This behaviour is not obtained by simply adding aluminium carbonate to pure aluminium hydroxide.

Formic acid and phosphoric acid ($H_3PO_4$) are readily-available commercial materials.

The proportions of the essential ingredients, as percentages by weight of the total accelerator (excluding water) are as follows:

|  | limits | preferred |
|---|---|---|
| aluminium hydroxide | 10–25 | 16–20 |
| aluminium sulphate (as $Al_2O_3$) | 30–60 | 40–50 |
| formic acid | 0.5–15 | } 6–10 combined acids |
| phosphoric acid | 0.45–15 |  |

In addition to these essential ingredients, there may additionally be present a number of other components, whose presence improves performance and which presence is therefore preferred.

The first of these is amine. This must be water-soluble, otherwise there is no restriction on the choice of amine. Preferred amines are alkanolamines, such as diglycolamine, diethanolamine and triethanolamine, diethanolamine being particularly preferred. Up to 5% by weight amine may be used, preferably from 0.5–1.5%.

The second preferred additional component, defoaming agent, may be any such material known to the art. Most of these are proprietary commercial materials whose precise composition is never revealed, but any such material known to the art is suitable. Typical examples include silicone types such as AGITAN (trade mark) and fatty acid polyether types such as LUMITEN (trade mark) EL.

The defoaming agent may be used at a rate out up to 5% (solids by weight of the whole composition), preferably from 0.5%–1%. The use of defoaming agent makes the use of less fresh aluminium hydroxides easier. Surprisingly, provided that the defoamer contains no silicone and that it is not present to the extent of more than 1%, it gives an appreciable improvement in setting time over that of an identical composition without defoaming agent or with silicone types.

The invention additionally provides a method of preparing an accelerator for cementitious compositions, comprising the reaction in aqueous medium of amorphous aluminium hydroxide, aluminium sulphate, formic acid and phosphoric acid.

The accelerator according to this invention may be manufactured using standard equipment and methods well known to those of ordinary skill in the art.

There are several different possible orders of addition of the components in the manufacture of the accelerator of the invention. In one method, the order of addition of the components to water is: aluminium sulphate, formic acid, phosphoric acid, aluminium hydroxide, amine and/or defoaming agent (if desired). An alternative is: aluminium sulphate, amine, formic acid, phosphoric acid, aluminium hydroxide, amine and/or defoaming agent (if desired).

The accelerators of this invention are very stable, with shelf lives of several months at normal temperatures and of several weeks in the warm conditions sometimes encountered in storage areas on site. In addition, they perform as accelerators as well as, or better than commercially-available alkali-free accelerators.

The invention therefore also provides a method of accelerating the set of a cementitious composition applied by spraying through a nozzle, comprising the addition at the nozzle of an accelerating quantity of an accelerator as hereinabove described.

Using this process a number of accelerators are prepared, and their details are shown in Table 1. The figures are percentages by weight of the total accelerator (including water).

(b) Stability Testing

The stability of the accelerators of Examples 1–9 is assessed at various temperatures—the higher the temperature the less likely is an accelerator to remain stable.

The results are shown in Table 2. A blank in the table means that the particular phenomenon (gelling, crystallisation, etc.) did not occur.

TABLE 1

|  | Example Nr. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| AS | 42 | 42 | 42 | 42 | 42 | 42 | 42 | 42 | 42 | 42 |
| AH | 18 | 18 | 18 | 18 | 18 | 18 | 18 | 18 | 18 | 18 |
| FA | 6.5 | 6.38 | 6.3 | 6.8 |  |  | 1.7 | 3.4 | 5.1 | 6.12 | 0.68 |
| PA | 0.3 | 0.42 | 0.3 |  | 6.8 | 5.1 | 3.4 | 1.7 | 0.68 | 6.12 |
| DEA | 1 | 1 | 1 | 1 | 1 | 1 | 1 | 1 | 1 | 1 |
| Water | 30.95 | 30.93 | 30.92 | 31.0 | 29.95 | 30.2 | 30.5 | 30.73 | 30.89 | 30.90 |
| appearance | opaque | opaque | opaque | clear | clear | clear | clear | clear | clear | clear |
| FA:PA | 96:4 | 94:4 | 92.5:7.5 | 100:0 | 0:100 | 25:75 | 50:50 | 75:25 | 90:10 | 10:90 |

TABLE 2

| Example No. | Change in turbidity after . . . days | | | Precipitated layer >1 mm after . . . days | | | Layer separation after . . . days | | | Gelling after . . . days | | | Crystallisation After . . . days | | |
| --- | --- | --- | --- | --- | --- | --- | --- | --- | --- | --- | --- | --- | --- | --- | --- |
|  | 30° C. | 35° C. | 40° C. | 30° C. | 35° C. | 40° C. | 30° C. | 35° C. | 40° C. | 30° C. | 35° C. | 40° C. | 30° C. | 35° C. | 40° C. |
| 1 | 21 | 14 | 6 |  | 30 | 16 |  | 27 | 16 |  |  |  |  |  |  |
| 2 | 21 | 14 | 6 |  | 30 | 16 |  | 27 | 16 |  |  |  |  |  |  |
| 3 | 21 | 14 | 6 |  | 30 | 16 |  | 27 | 16 |  |  |  |  |  |  |
| 4 | 13 | 7 | 5 |  | 22 | 12 |  |  | 12 |  |  |  |  |  |  |
| 5 |  |  |  |  |  |  |  |  |  |  |  |  |  |  |  |
| 6 |  |  |  |  |  |  |  |  |  |  |  |  |  |  |  |
| 7 |  |  |  |  |  |  |  |  |  |  |  |  |  |  |  |
| 8 |  | 12 | 7 |  |  | 18 |  |  |  |  |  |  |  |  |  |
| 9 | 20 | 12 | 7 |  |  | 1.4 |  |  |  |  |  |  |  |  |  |

A typical dosage of accelerator added at the nozzle is from 5%–7% by weight of the accelerator by weight of cement.

The invention is further described with reference to the following non-limiting examples.

(a) Preparation of Accelerator

The following materials are used:

aluminium sulphate (17%) (AS)

amorphous aluminium hydroxide (AH)

formic acid (FA)

phosphoric acid (PA)

diethanolamine (DEA)

The process used in this example is as follows:

Water is heated to 45° C. and gently stirred. The aluminium sulphate is added to this water. The temperature is gradually raised to 58° C., and stirring is continued until the aluminium sulphate is completely dissolved. To this stirred solution, formic acid is slowly added, followed by phosphoric acid. The rate of stirring is then increased and aluminium hydroxide is gradually added. This is followed by the addition of diethanolamine, and stirring at the increased rate is continued for one hour. Stirring is then stopped and the composition allowed to cool.

3. Paste Testing

A cement paste composition is made by adding 300 grams of Portland cement (CEM I 42.5) to water, to give a paste with a water/cement ratio of 0.3. There is additionally added 1 gram of a superplasticiser (GLENIUM© 51, a polycarboxylate superplasticiser is used).

Samples of this paste are dosed with the accelerators of Examples 4–10 at 6% by weight accelerator by weight of cement, and they are tested using Vicat needles for initial and final set. The results are as follows:

| Example No. | Initial set (m.s.) | Final set (m.s.) |
| --- | --- | --- |
| 4 | 7.00 | 22.00 |
| 5 | 9.00 | 29.00 |
| 6 | 7.00 | 23.00 |
| 7 | 8.00 | 24.00 |
| 8 | 7.00 | 19.00 |
| 9 | 8.00 | 22.00 |
| 10 | 6.50 | 22.00 |

The invention claimed is:

1. An accelerator comprising the reaction product in aqueous medium of amorphous aluminium hydroxide, wherein the amorphous aluminium hydroxide contains aluminium carbonate, aluminium sulphate, formic acid and phosphoric acid, wherein said accelerator is adapted for use in sprayed cementitious compositions.

2. The accelerator of claim 1, wherein the accelerator comprises:

| | |
|---|---|
| aluminium hydroxide | 10% to 25% |
| aluminium sulphate (as $Al_2O_3$) | 30% to 60% |
| formic acid | 0.5% to 15% |
| phosphoric acid | 0.45% to 15%. |

3. The accelerator of claim 2, wherein the accelerator comprises:

| | |
|---|---|
| aluminium hydroxide | 16% to 20% |
| aluminium sulphate (as $Al_2O_3$) | 40% to 50% |
| formic acid and phosphoric acid | 6% to 10%. |

4. The accelerator of claim 1, wherein the accelerator additionally contains at least one of an amine or a defoamer.

5. The accelerator of claim 4, wherein the amine comprises an alkanolamine.

6. The accelerator of claim 5, wherein the alkanolamine comprises at least one of diglycolamine, diethanolamine, or triethanolamine.

7. The accelerator of claim 4, wherein the accelerator comprises up to 5% amine based on weight of accelerator.

8. The accelerator of claim 4, wherein the accelerator comprises 0.5% to 1.5% amine based on weight of accelerator.

9. The accelerator of claim 4, wherein the accelerator comprises up to 5% defoamer solids based on total weight of accelerator.

10. The accelerator of claim 4, wherein the accelerator comprises 0.5% to 1% defoamer solids based on total weight of accelerator.

11. The accelerator of claim 4, wherein the accelerator comprises defoamer containing no silicone in an amount of up to 1% solids based on total weight of accelerator.

12. The accelerator of claim 2, wherein the accelerator additionally contains at least one of an amine or a defoamer.

13. The accelerator of claim 12, wherein the amine comprises an alkanolamine.

14. The accelerator of claim 13, wherein the alkanolamine comprises at least one of diglycolamine, diethanolamine, or triethanolamine.

15. The accelerator of claim 12, wherein the accelerator comprises up to 5% amine based on weight of accelerator.

16. The accelerator of claim 12, wherein the accelerator comprises 0.5% to 1.5% amine based on weight of accelerator.

17. The accelerator of claim 12, wherein the accelerator comprises up to 5% defoamer solids based on total weight of accelerator.

18. The accelerator of claim 12, wherein the accelerator comprises 0.5% to 1% defoamer solids based on total weight of accelerator.

19. The accelerator of claim 12, wherein the accelerator comprises defoamer containing no silicone in an amount of up to 1% solids based on total weight of accelerator.

20. The accelerator of claim 1, wherein the proportion of aluminium carbonate is up to 5% by weight of the aluminium hydroxide.

21. A method of preparing an accelerator for cementitious compositions, comprising reacting in aqueous medium, amorphous aluminium hydroxide, wherein the amorphous aluminium hydroxide contains aluminium carbonate, aluminium sulphate, formic acid and phosphoric acid and optionally at least one of amine or defoamer.

22. The method of claim 21, in which the reacting is by adding to the aqueous medium the components in an order selected from one of the following:
  (i) aluminium sulphate, formic acid, phosphoric acid, aluminium hydroxide, wherein the amorphous aluminium hydroxide contains aluminium carbonate, and optionally at least one of amine or defoaming agent;
  (ii) aluminium sulphate, amine, formic acid, phosphoric acid, aluminium hydroxide, wherein the amorphous aluminium hydroxide contains aluminium carbonate, and optionally at least one of amine or defoaming agent.

23. A method of accelerating the set of a cementitious composition applied by spraying through a nozzle, the method comprising adding to the cementitious composition at the nozzle an accelerating quantity of an accelerator that comprises the reaction product in aqueous medium of amorphous aluminium hydroxide, wherein the amorphous aluminium hydroxide contains aluminium carbonate, aluminium sulphate, formic acid and phosphoric acid.

24. The method of claim 23 wherein the amount of accelerator added at the nozzle is from 5% to 7% by weight of the cement.

25. A cementitious composition produced by the method of claim 23.

26. A cementitious composition produced by the method of claim 24.

* * * * *